(12) United States Patent
Knoll et al.

(10) Patent No.: US 6,737,015 B1
(45) Date of Patent: May 18, 2004

(54) METHOD FOR PRODUCING COMPOSITE MATERIALS AND EXAMPLES OF SUCH COMPOSITE MATERIALS

(75) Inventors: Guenter Knoll, Stuttgart (DE); Gert Lindemann, Lichtenstein (DE); Friederike Lindner, Gerlingen (DE); Matthias Wiedmaier, Ebersbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,777

(22) PCT Filed: Oct. 1, 1999

(86) PCT No.: PCT/DE99/03155

§ 371 (c)(1),
(2), (4) Date: Nov. 1, 2000

(87) PCT Pub. No.: WO00/20352

PCT Pub. Date: Apr. 13, 2000

(30) Foreign Application Priority Data

Oct. 2, 1998 (DE) .......................................... 198 45 532

(51) Int. Cl.[7] .................................................. B22F 3/12
(52) U.S. Cl. .......................................... 419/13; 419/57
(58) Field of Search ...................... 419/13, 57; 501/97.4

(56) References Cited

U.S. PATENT DOCUMENTS 4,907,015 A * 3/1990 Kaneko et al. ......... 346/76 PH
5,384,081 A * 1/1995 Wotting et al. ................ 264/65
5,948,717 A * 9/1999 Klemm et al. ............. 501/97.4

FOREIGN PATENT DOCUMENTS

| DE | 36 06 403 | 8/1986 |
| DE | 37 34 274 | 7/1988 |
| DE | 195 00 832 | 7/1996 |
| EP | 0 335 382 | 10/1989 |
| EP | 0 520 211 | 12/1992 |

* cited by examiner

*Primary Examiner*—Daniel Jenkins
(74) *Attorney, Agent, or Firm*—Kenyon & Kenyon

(57) ABSTRACT

A method for manufacturing composite materials from a parent substance containing silicon nitride and metal silicide, having fixed electrical properties. The molded articles are made, virtually with their final contours, prior to a sintering operation. The parent substance containing $Si_3N_4$ and a metal silicide is subjected to a gas pressure sintering in a nitrogenous atmosphere. The metal silicide is of the form $Me_5Si_3$, where Me is a metal. As a function of a sintering temperature, a lower limit of partial nitrogen pressures is selected so that $Si_3N_4$ is stable at the lower limit and an upper limit of the partial nitrogen pressures is selected so that $Me_5Si_3$ is stable at the upper limit. The resulting composite material is a silicon-containing composite material made of $Si_3N_4$ and the metal silicide. The metal silicide is selected from the group of $Nb_5Si_3$, $V_5Si_3$, $Ta_5Si_3$ and $W_5Si_3$.

26 Claims, 1 Drawing Sheet

METHOD FOR PRODUCING COMPOSITE MATERIALS AND EXAMPLES OF SUCH COMPOSITE MATERIALS

FIELD OF THE INVENTION

The present invention relates to a method for fabricating a composite material out of a parent substance containing silicon nitride and a metal silicide, through gas pressure sintering in a nitrogenous atmosphere and a silicon-containing composite material, whose silicon-containing constituents are made of $Si_3N_4$ and of a metal silicide.

BACKGROUND INFORMATION

There are composite materials, which contain silicon nitride and metal silicide, and methods for their preparation. The fabrication of such materials through single-axial not pressing (unconfined sintering under pressure) is discussed in German Published Patent Application Nos. 37 34 274 and 36 06 403, in which the parent substance contains $Si_3 N_4$ and the metal silicide $MoSi_2$, and in European Patent Application No. 0 335 382, in which the parent substance contains $Si_3 N_4$ and $MO_5 Si_3$ as the metal silicide and carbon, and the fabricated material contains as metal silicide, $Mo_5Si_3C$ or, more precisely, $Mo_{5-X}Si_3C_{1-Y}$ ($0 \leq X \leq 2$; $0 \leq Y \leq 1$). The electrical properties of the materials fabricated in this manner are able to be selectively adjustable. It is believed that the method is industrial and requires considerable outlay for energy consumption and that the application of the method only permits fabrication of complex geometrical structures in expensive, hard-machining operations.

German Published Patent Application No. 195 00 832, i.e., European Patent Application No. 0 721 925, discusses the fabrication of highly heat-resistant silicon nitride composite materials, which contain a reinforcement component of $Me_5Si_3$ and, moreover, $MeSi_2$ or $MeSi_2$, and silicides of other stoichiometries, Me standing for metal. Mixed into the parent substance as metal silicide are $MeSi_2$ and $Me_5Si_3$, or only $MeSi_2$. The metals may be selected from the group including molybdenum, tungsten, chromium, tantalum, niobium, manganese and vanadium. The sintering is performed as gas pressure sintering (at $N_2$ pressures of 100 bar), which makes it possible to fabricate molded articles (shaped bodies), virtually with their final contours, in ceramic injection molding or pressing processes, with subsequent green processing, or in hot-pressing (sintering under pressure) processes. Special electrical properties cannot be

SUMMARY OF THE INVENTION

An object of an exemplary embodiment of the present invention is an industrially simple and energy-saving method for fabricating composite materials containing silicon nitride and metal silicide and having fixed electrical properties, which makes it possible to manufacture the molded articles, virtually with their final contours, from the composite material, prior to the sintering operation, and to specify representatives of such composite materials in an exemplary method, where $Me_5 Si_3$ is introduced as the metal suicide into the parent substance, the partial pressure of the nitrogen being established as a function of the sintering temperature in such a way that, at the lower limit of the practical range, $Si_3N_4$ is still thermodynamically stable and, at the upper limit, $Me_5Si_3$, and is dissolved into a composite material of the type mentioned at the outset, the sit metal silicide being selected from the group $Nb_5Si_3$, $V_5Si_3$, $Ta_5Si_3$ and $W_5Si_3$.

To exploit the advantages of the gas-pressure sintering method, at the same time while manufacturing composite materials having fixed electrical properties it was ascertained that the electrical properties cannot be adjusted in a determinate fashion (definably) when $N_2$ applied above a specific pressure range. During test trials, it was found that there is a range of the $N_2$ partial pressures within which one can prevent other silicon-containing components, besides $Si_3N_4$ and $Me_5Si_3$, from being present in the finished composite material. In this manner, composite materials were fabricated having fixed electrical properties. In comparison to the hot-pressing (sintering under pressure) method, the gas-pressure sintering method makes do with a much simpler sintering device. Compact, high-strength materials are able to be fabricated with the exemplary method to the present invention. In comparison to materials containing $MeSi_2$, materials containing $Me_5Si_3$ are believed to a very low temperature dependency of the electrical conductivity.

The method is carried out in such a way that the metal silicide in the composite material has a carbon concentration (preferably between about 0.3 and about 0.6% by weight specific to the composite material), i.e., is present as $Me_5Si_3$ (C).

DETAILED DESCRIPTION

The exemplary embodiments of the method according the present invention described in the following are believed to be particularly advantageous. However, they are merely provided by way of example, and suitable appropriate variations are possible, without departing from the scope of the claims.

Figure 1:
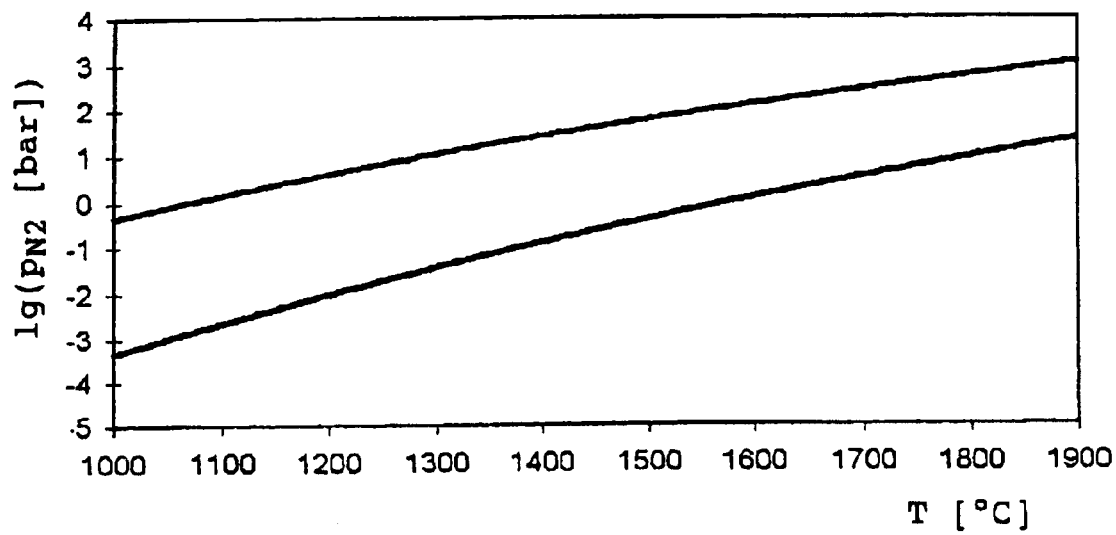
FIG. 1 shows in a diagram, with respect to a sintering temperature, the logarithm of the lower and upper limit values of the $N_2$ partial pressures, applicable in the method of the exemplary embodiment according to the present invention, for fabricating a composite material containing $Mo_5Si_3$.
Figure 2:
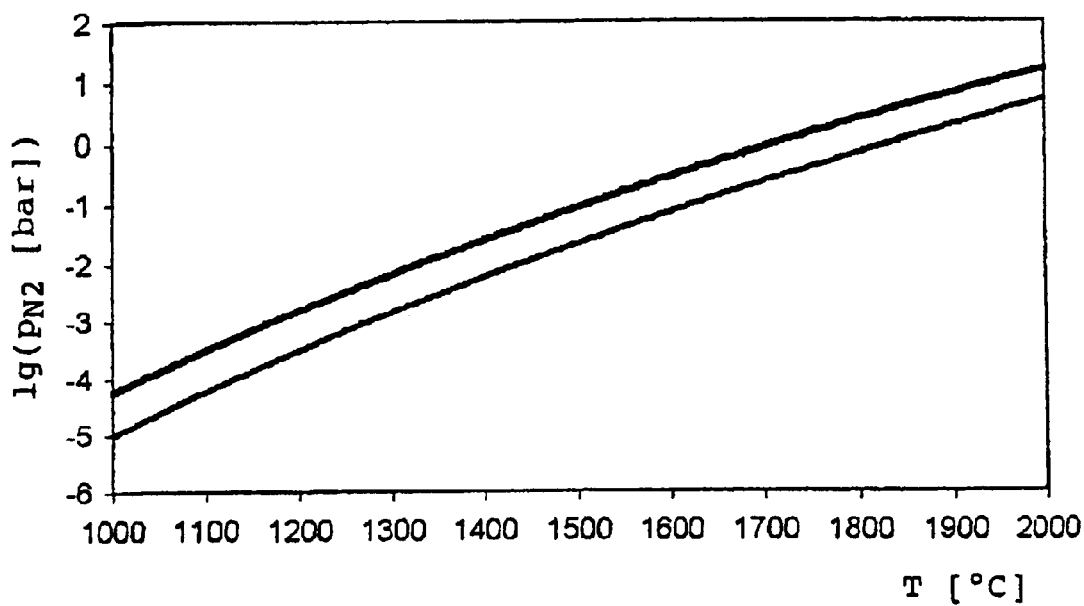
FIG. 2 shows in another diagram, with respect to the sintering temperature, the logarithm of the lower and upper limit values of the $N_2$ partial pressures, applicable in the method of the exemplary embodiment according to the present invention, for fabricating a composite material containing $Nb_5Si_3$.

To fabricate the composite materials, a preconditioned $Si_3N_4$ powder is first mixed with sinter additives, such as $Al_2O_3$, $Y_2O_3$, or the like, which (in terms of the entire inorganic concentration-, make up less than about 10% by weight, $Me_5Si_3$ in suitable percentages by weight and, in some instances, organic pressing and/or binding agents, with the addition of an organic solvent, which may be done in an attritor mill. The attrited suspension is dried, for example, in a rotary evaporator. From the dried powder, through cold-isostatic pressing at pressures of between about 150 and 250 MPa, molded articles are produced, which, subsequent to the pressing operation, can obtain their final shape in a green processing. Other processing possibilities following the introduction of appropriate binding agents, include ceramic injection molding (CIM) or extrusion. For debinding and/or presintering purposes, the molded articles are treated at approximately 600° C. under a pressure of 1 bar in an inert gas atmosphere for about two hours, the organic constituents being removed, virtually without leaving any residues. The main sintering operation then follows, which may occur, for example, in a gas-pressure sintering furnace at a temperature within a range of about 1700 and 1900° C., including between about 1800 and 1900° C., under a defined partial $N_2$ pressure (total pressure between about 0.1 MPa and 10 MPa), which is set so as to achieve thermodynamic equilibrium of the $Si_3N_4$ phase and the $Me_5Si_3$ or $Me_5Si_3(C)$ phase during the sintering compression, i.e., to ensure they do not enter into any chemical reactions. The usable range of the partial $N_2$ pressure at a specific temperature is dependent upon the metal silicide. In the diagrams of FIGS. 1 and 2, the ranges of the usable partial $N_2$ pressures, measured in bar, ($p_{N2}$) for mixtures containing $Mo_5Si_3$ or $Nb_5Si_3$ are plotted as $\log(p_{N2}\text{ [bar]})$ as a function of the temperature. In each case, the upper and lower limiting curves satisfy, for Mo-containing mixtures, the equations $$y_1 = 5.3071 \cdot \ln(T) - 37.014$$

respectively $$y_2 = 7.3494 \cdot \ln(T) - 54.124$$

and, for Nb-containing mixtures, the equations $$y_1 = 7.8968 \cdot \ln(T) - 58.8$$

respectively $$y_2 = 8.2598 \cdot \ln(T) - 62.064,$$

$y_1$ and $y_2$ representing $\lg(p_{N2}\text{ [bar]})$ values. Below the limited range, $Si_3N_4$ reacts with $Me_5Si_3$. Above the limited range, $Me_5Si_3$ reacts with nitrogen. The curves were determined in serial investigations, in that, at a fixed temperature of between about 1700 and 1900° C., the partial $N_2$ pressures were determined at which $Me_5Si_3$ and $Si_3N_4$ are thermodynamically stable. The criterion that no reaction took place is, in each case, that only the desired silicon-containing phases are found in the X-ray diffractogram of the sintered material. The equations named above were then determined on the basis of these values, of known data, such as enthalpies of formation, and of thermodynamic functions. The sintering process takes about two to five hours.

The specific electrical resistance of the composite materials fabricated in accordance with the exemplary embodiment of the method of the present invention is adjusted through the selection of the metal in the silicide and the concentration and the distribution of the silicide in the composite material. Beyond the particular percolation range, specific electrical resistances of between about $1.7 \cdot 10^{-4}$ $\Omega$cm and $1 \cdot 10^{12}$ $\Omega$cm can be reproducibly adjusted with materials containing $Nb_5Si_3(C)$, and of between about $1 \cdot 10^{-5}$ $\Omega$cm and $1 \cdot 10^{12}$ $\Omega$cm with materials containing $Mo_5Si_3(C)$. The specific resistance is measured using the four-point method.

Using qualitative and quantitative chemical and physico-chemical analyses and radiographic phase analysis, one can verify that—apart from the carbon concentration and without consideration of the organic constituents—the sintered materials have the same composition as the mixture that the fabrication process originated with. During the sintering process in a graphite furnace, the carbon maybe contained in the metal silicide with a concentration, in terms of the composite material, of between about 0.3 and 0.6% by weight, and including with about 0.5% by weight. The room (ambient) temperature stabilities of the composite materials do not lie under 500 MPa.

Besides standing for niobium and molybdenum having comparable results for all metals of the 5th and 6th subgroup of the periodic table or system, Me can stand, in particular, for vanadium, tantalum, chromium and tungsten.

The exemplary embodiment of the method of the present invention is described in greater detail in the following on the basis of two special examples.

EXAMPLE 1

The parent substance was mixed from 36% by weight of $Si_3N_4$, 1.7% by weight of $Al_2O_3$, 2.38% by weight of $Y_2O_3$, 60 $Nb_5Si_3$% by weight and the usual pressing and/or binding agents. The average particle size of the $Si_3N_4$ was 0.7 $\mu$m, and that of the $Nb_5Si_3$ 0.7 $\mu$m. The cold isostatic compression at 200 MPa was followed by a pre-sintering under an inert gas at up to 600° C., argon being used (nitrogen also could have been used). Sintering subsequently took place at a partial $N_2$ pressure of 0.5 MPa (total pressure 1 MPa) and 1800° C. in a graphite furnace.

The density of the composite material obtained was 97% of the material density. The radiographic phase analysis performed after the sintering process yielded exclusively $Si_3N_4$ and $Nb_5Si_3(C)$ as silicon-containing phases. As a specific electrical resistance, $3 \cdot 6 \cdot 10^{-3}$ $\Omega$cm was determined at 25° C. The temperature coefficient of the specific electrical resistance amounted to $2 \cdot 10^{-4}$ $K^{-1}$.

EXAMPLE 2

Besides the fact that the inorganic constituents of the parent substance were made up of 54% by weight of $Si_3N_4$, 2.6% by weight of $Al_2O_3$, 3.4% by weight of $Y_2O_3$, 40 $Nb_5Si_3$% by weight, the method was carried out in the same manner as in Example 1.

The analyses performed on the sintered material likewise yielded the attained material density amount of 97%, the radiographic phase analysis yielded exclusively $Si_3N_4$ and $Nb_5Si_3(C)$ as silicon-containing phases, and $2 \cdot 10^2$ $\Omega$cm at 25° C. was determined as a specific electrical resistance.

What is claimed is:

1. A method for fabricating a composite material, the method comprising the steps of:

providing a parent substance containing a silicon nitride and a metal silicide, the silicon nitride being $Si_3N_4$ and the metal silicide being of a form $Me_5Si_3$, where Me is a metal;

establishing, as a function of a sintering temperature, an upper limit and a lower limit of partial nitrogen pressures so that the silicon nitride is stable at the lower limit and the metal silicide is stable at the upper limit; and gas pressure sintering the parent substance in a nitrogenous atmosphere based on the lower limit and the upper limit.

2. The method of claim 1, wherein the metal of the metal silicide is selected from a metal of one of a 5th subgroup and a 6th subgroup of the periodic table.

3. The method of claim 2, wherein the metal of the metal silicide is selected from the group of Mo, Nb, V, Nb, Ta and W.

4. The method of claim 1, wherein a weight ratio of $Si_3N_4:Me_5Si_3$ is between about 20:80 and about 80:20.

5. The method of claim 1, wherein the parent substance includes sinter additives.

6. The method of claim 5, wherein the sinter additives include at least one of aluminum oxide and yttrium oxide.

7. The method of claim 5, wherein a concentration of the sinter additives in an initial mixture is less than about 10% by weight.

8. The method of claim 1, wherein the parent substance includes pressing agents and binding agents.

9. The method of claim 1, wherein the parent substance is ground into a powder.

10. The method of claim 1, further comprising one of the following sets of steps:
   (a) forming the parent substance into a desired shape by one of ceramic injection molding and cold-isostatic pressing before the step of gas pressure sintering; and
   (b) (i) forming the parent substance into the desired shape by the one of the ceramic injection molding and the cold-isostatic pressing before the step of gas pressure sintering, and
      (ii) forming the composite material by green processing subsequent to the step of gas pressure sintering.

11. The method of claim 1, wherein the parent substance is cold-isostatically compressed at a pressure of between about 100 MPa and about 300 MPa.

12. The method of claim 1, further comprising the step of pre-sintering the parent substance prior to the step of gas pressure sintering.

13. The method of claim 12, wherein the step of pre-sintering is performed at a temperature of between about 500° C. and about 700° C.

14. The method of claim 12, wherein the step of pre-sintering is performed at a pressure of between about 0.05 Mpa and about 0.2 MPa.

15. The method of claim 1, wherein the step of gas pressure sintering is performed at a temperature of between about 1700° C. and about 1900° C.

16. The method of claim 1, wherein the step of gas pressure sintering is performed at a partial $N_2$ pressure of between about 0.5 MPa and about 1.0 MPa.

17. The method of claim 2, wherein:
   the metal of the metal silicide is molybdenum; and
   the upper limit is set as an upper limit of partial $N_2$ pressures ($p_{N2}$) according to a first equation of $y_1=5.3071 \cdot \ln(T)-37.014$, and
   the lower limit is set as a lower limit of the partial $N_2$ pressures ($p_{N2}$) according to a second equation of $y_2=7.3494 \cdot \ln(T)-54.124$,
   where $y_1$ and $y_2$ represent $\lg(p_{N2}$ [bar]) values.

18. The method of claim 2, wherein:
   the metal of the metal silicide is niobium; and
   the upper limit is set as an upper limit of partial $N_2$ pressures ($p_{N2}$) according to a first equation of $y_1=7.8968 \cdot \ln(T)-58.8$, and
   the lower limit is set as a lower limit of the partial $N_2$ pressures ($p_{N2}$) according to a second equation of $y_2=8.2598 \cdot \ln(T)-62.064$,
   where $y_1$ and $y_2$ represent $\lg(p_{N2}$ [bar]) values.

19. The method of claim 1, wherein the step of gas pressure sintering is performed in a gas-pressure sintering furnace.

20. A silicon-containing composite material comprising a silicon-containing material made of $Si_3N_4$ and a metal silicide, wherein the metal silicide is selected from the group of $Nb_5Si_3$, $V_5S_3$, $TaSi_3$ and $W_5Si_3$, wherein the metal silicide contains carbon.

21. The composite material of claim 20, wherein the metal silicide contains carbon with a concentration specific to the composite material of about 0.3% by weight to about 0.6% by weight.

22. The composite material of claim 20, wherein a mass ratio of $Si_3N_4$:$Me_5Si_3$ is between about 20:80 and about 80:20.

23. The composite material of claim 20, wherein the parent substance includes sinter additives.

24. The composite material of claim 23, wherein the sinter additives include at least one of aluminum oxide and yttrium oxide.

25. The composite material of claim 23, wherein a concentration of the sinter additives in an initial mixture is less than about 10% by weight.

26. The composite material of claim 20, wherein the metal silicide is $Nb_5Si_3$.

* * * * *

UNITED STATES PATENT AND TRADEMARK OFFICE
CERTIFICATE OF CORRECTION

PATENT NO. : 6,737,015 B1
APPLICATION NO. : 09/555777
DATED : May 18, 2004
INVENTOR(S) : Guenter Knoll et al.

It is certified that error appears in the above-identified patent and that said Letters Patent is hereby corrected as shown below:

Column 1, lines 18-19, change "single-axial not pressing" to --single-axial hot-pressing--

Column 1, line 37, change "and, moreover, $MeSi_2$ or $MeSi_2$," to --and, moreover, $MeSi_2$,--

Column 1, line 48, change "properties cannot be" to --properties cannot be adjusted.--

Column 1, line 58, change "composite materials, in an" to --composite materials.
  In an...--

Column 1, lines 59-60, change "the metal suicide" to --the metal silicide--

Column 1, line 64, change "and is dissolved" to --is dissolved--

Column 1, line 65, change "the sit metal" to --the metal--

Column 2, line 3, change "electrical properties it" to --electrical properties, it--

Column 2, line 5, change "when $N_2$ applied" to --when $N_2$ partial pressures are applied--

Column 2, line 7, change "the $N_2$ partial pressures" to --the $N_2$ partial pressures--

Column 2, line 15, change "method to the" to --method according to the--

Column 2, line 17, change "are believed to a very" to --are believed to exhibit a very--

Column 2, line 50, change "inorganic concentration-," to --inorganic concentration)--

Column 3, line 58, change "carbon maybe contained" to --carbon may be contained--

Column 3, line 61, change "including with about 0.5%" to --including about 0.5%--

UNITED STATES PATENT AND TRADEMARK OFFICE
CERTIFICATE OF CORRECTION

PATENT NO.       : 6,737,015 B1
APPLICATION NO.  : 09/555777
DATED            : May 18, 2004
INVENTOR(S)      : Guenter Knoll et al.

It is certified that error appears in the above-identified patent and that said Letters Patent is hereby corrected as shown below:

Column 6, line 18, change "$TaSi_3$" to --$Ta_5Si_3$--

Signed and Sealed this

Sixth Day of November, 2007

JON W. DUDAS
*Director of the United States Patent and Trademark Office*